United States Patent [19]

Schudel

[11] 4,089,587

[45] May 16, 1978

[54] PROJECTION SCREEN SURFACE AND METHOD OF FORMING SAID SURFACE

[76] Inventor: Conrad R. Schudel, 7415 Convoy Ct., San Diego, Calif. 92111

[21] Appl. No.: 679,610

[22] Filed: Apr. 23, 1976

Related U.S. Application Data

[63] Continuation-in-part of Ser. No. 527,974, Nov. 29, 1974, abandoned.

[51] Int. Cl.² ............................................. G03B 21/56
[52] U.S. Cl. ..................................... 350/125; 350/129
[58] Field of Search ......................... 350/125, 129, 117

[56] References Cited

U.S. PATENT DOCUMENTS

| 3,194,863 | 7/1965 | Williams, Jr. et al. | 350/117 X |
| 3,408,132 | 10/1968 | Chandler et al. | 350/125 |
| 3,811,750 | 5/1974 | Coulthard | 350/129 X |
| 3,844,644 | 10/1974 | Martinez | 350/129 X |

FOREIGN PATENT DOCUMENTS

| 138,904 | 2/1947 | Australia | 350/129 |

*Primary Examiner*—Richard A. Wintercorn
*Attorney, Agent, or Firm*—Townsend and Townsend

[57] ABSTRACT

The present invention provides an improved projection screen. The screen includes a film which is constructed of at least partially deformable, resilient material. One surface of the film has in combination a random matte texture and a substantially unidirectional striated texture. A layer of reflective material is deposited on the above-mentioned surface of the film to provide a high gain, damage resistant reflective surface. In one embodiment of the present invention, the layer of reflective material is located on the back surface of the film, and the front surface has a matte texture so that light from a projector or other source passes through the matte surface of the film to be reflected by the layer of reflective material on the back surface thereof. In another embodiment of the present invention, the layer of reflective material is located on the front surface of the film so that light projected on the screen is reflected by the layer of reflective material without passing through the film.

33 Claims, 15 Drawing Figures

|←— 0.2" —→|

FIG. 7A.

|←— 0.1" —→|

FIG. 7B.

|←— 0.01" —→|

FIG. 7C.

|←— 0.005" —→|

FIG. 7D.

PROJECTION SCREEN SURFACE AND METHOD OF FORMING SAID SURFACE

This application is a continuation-in-part of my previous application also entitled PROJECTION SCREEN SURFACE, Ser. No. 527,974, filed Nov. 29, 1974 now abandoned.

BACKGROUND OF THE INVENTION

The present invention relates to projection screens, and in particular to improved reflective elements which form the surface of the screen.

Projection screens have been developed which employ the dull side of compression rolled aluminum foil as the reflective element. The screens have improved reflective properties relative to the beaded and lenticular screens which have been standard, and are now used in double curved screens in place of beaded or lenticular reflective screens. Also, screens with compound curvature have been developed using such foil reflective elements which focus the reflected image in a predesignated area and reject outside light to a degree that the screens can often be used in the daytime, as illustrated in the patent to Chandler, U.S. Pat. No. 3,408,132. If ambient light is high, such screens can be used in the daytime with a high-power projector, and with a relatively low-power projector when excessive ambient light is not present. In such screens the irregular surface of the reflective foil provides the foil material with high gain to protect the image in the predesignated area spreading the image uniformly throughout that area.

A primary difficulty with compression rolled aluminum foil screens is that the irregular surface of the screen which provides its high gain can quite easily be scratched or otherwise damaged. The reflective surface of such screens is exposed and is extremely fragile, ane even minor contact with the screen can damage it so that the image projected thereon is impaired. As a result, the utility of such screens is limited even through their advantages are well known.

A primary usage of known aluminum foil screens is in the large screen projection television systems which are now becoming quite popular. Many of such television systems utilize a relatively small television receiver, the picture from which is projected by a lens and in some cases employing various mirrors onto a large projection screen of the aluminum foil type.

Both the advantages and inherent difficulties in using the aluminum foil screens described above become readily apparent when such screens are used in a television projection system. The advantage of such as screen is that a sufficiently bright picture is provided even though the projection system has relatively little power as long as the room in which the device is located is kept sufficiently dark. However, the gain of the device is insufficient to permit ready viewing of the projected image in areas with high ambient light. A further difficulty with such screens is that in a home environment, the likelihood that the screens will be permanently damaged is extremely high. Television projection systems using this type of screen are ordinarily supplied with instructions and warnings as to the fragility of the screen, and a camels hair dusting brush is recommended so that some effort can be made to clean the screen. The reflective properties of the screen are impaired by accumulations of cigarette smoke, cooking oils, fingerprints, and other deposits, and cannot be readily removed without damaging the screen. The likelihood that the screen will still be damaged in a home environment is quite high, and the useful life of such a screen in a home environment is quite limited.

SUMMARY OF THE INVENTION

The present invention provides an improved projection screen. The screen includes a film which is constructed of at least partially deformable, resilient material. One surface of the film has in combination a substantially random matte texture and a substantially unidirectional striated texture. A layer of reflective material is deposited on the above-mentioned surface of the film to provide a high gain, damage resistant reflective surface.

In one embodiment of the present invention, a layer of reflective material is located on the back surface of the film, the film being translucent, and the front surface of the film has either a matte or a striated texture. If the front surface is matte, the rear surface on which the reflective material is deposited is striated. In this manner, the light from the light projector or other source passes through the matte surface of the film to be reflected by the reflective material on the back surface of the film.

The aforementioned embodiment of the present invention has been found to have nearly the equivalent brightness of aluminum foil screens, even though the light from the projector passes through the protective film in two directions. Because the metalized layer is on the back of the film, any possible damage thereto is reduced or eliminated. The exposed film is far less subject to damage and can readily be cleaned. A striated texture on the front of the film, or the combination of the matte surface on the front and the striated texture on the back surface of the film, provide proper directional characteristics so that an image of sufficient brightness is achieved so as to provide an acceptable image in many installations.

In the second embodiment of the present invention, the layer of reflective material is located on the front surface of the film. The film merely provides a supporting surface for the reflective material. In this embodiment, light projected on the screen is reflected by the reflective layer without passing through the film.

The second embodiment of the present invention is preferred over the first embodiment in circumstances where increased brightness is desirable or in areas where high levels of ambient light are present. In the second embodiment preliminary tests have indicated that the gain of the screen material is increased more than approximately 75% over the first embodiment and compression rolled foil screens, yielding an extremely bright picture. The brightness of the screen and its ability to reject ambient light allow for its use with the low projector power encountered in television projection systems as discussed hereinabove so that such systems can readily be used even in the presence of high ambient light.

In the second embodiment, the use of a partially deformable, resilient film greatly reduces the damage problem inherent in aluminum foil screens. If an object contacts the screen, the metalized film is deformed, and usually the reflective material itself is not damaged. When the object is removed, the resilient metalized film returns to, or near, its initial configuration and usually no permanent damage is sustained. Furthermore, it has been found that a hard protective aluminum oxide layer is formed on the exposed aluminum which resists further change, and the screen can be readily cleaned using standard non-abrasive window cleaning fluid.

Screens having some characteristics in common with the second embodiment of the present invention have been tried in the past, but have not been very successful. One of the primary reasons why such prior devices have been considered failures appears to be that the proper balance between gain and dispersion has not been realized. In the present invention, the surface of the film on which the reflective material is deposited has in combination a random matte texture and a unidirectional striated texture. The matte texture provides acceptable vertical dispersion, as explained in more detail hereinafter, while the striated texture provides additional horizontal dispersion. This combined texture when properly employed and metalized and when curved for short throw lenses, provides a very bright, consistent image throughout the selected viewing area, even when used with a low-power projector in high ambient lighting conditions.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIGS. 4A, B, C and D are sequential perspective views demonstrating the construction of the second embodiment of the present invention with the visible characteristics thereof greatly enlarged;

FIG. 5 is a perspective view of a variation of the second embodiment of the present invention having the visible characteristics thereof greatly enlarged;

FIG. 6 is a perspective view of a second variation of the second embodiment of the present invention having the visible characteristics thereof greatly enlarged;

DESCRIPTION OF THE PREFERRED EMBODIMENTS

Figures 1, 2, 2A, 3A, 3B:
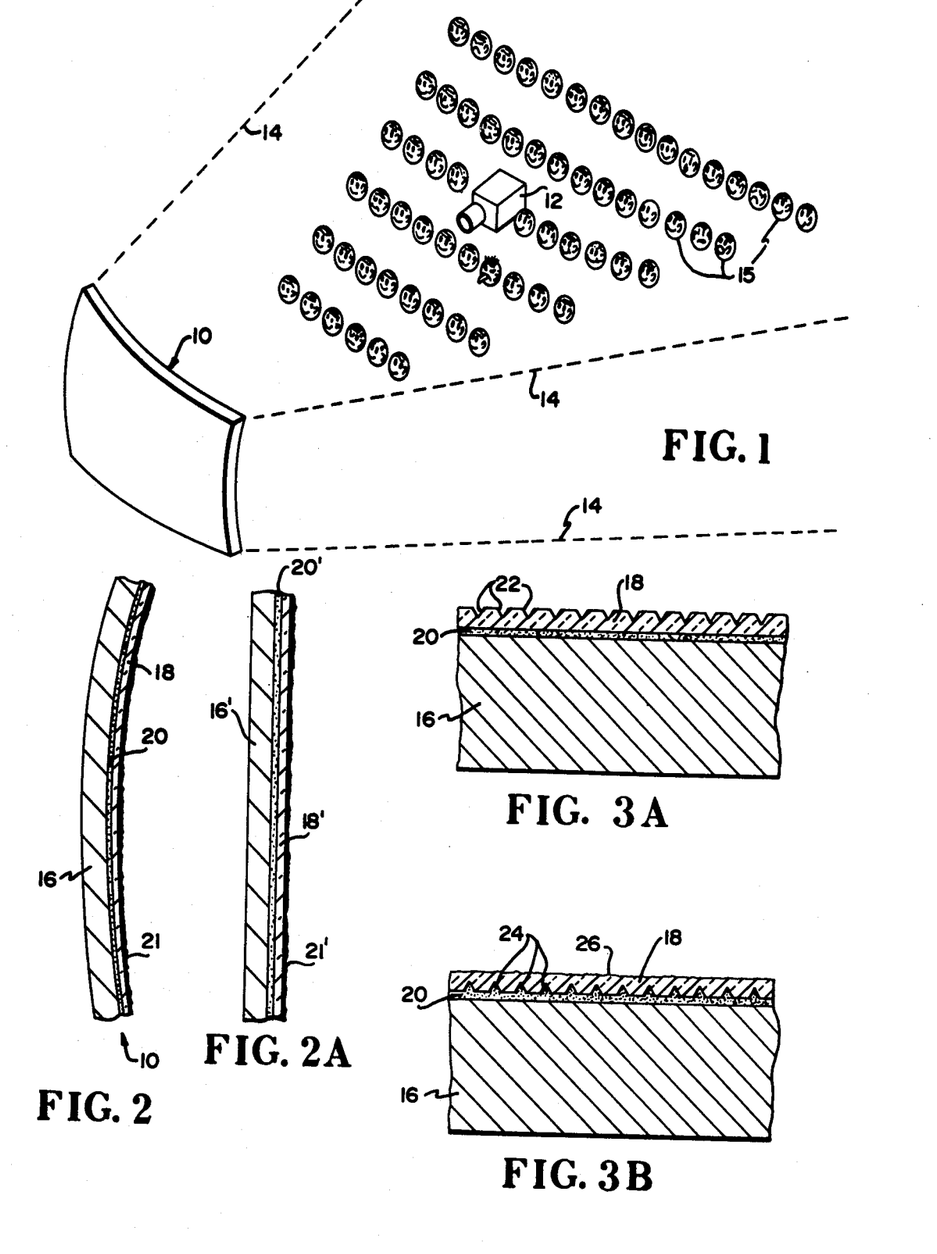
FIG. 1 is a perspective view illustrating the use of the present invention as part of a doubly curved screen.
FIGS. 2 and 2A are greatly enlarged side cross-sectional fragmentary views of a portion of the projection screen of the present invention for curved and flat screens respectively.
FIGS. 3A and 3B are greatly enlarged cross-sectional views of two alternative embodiments of the projection screen of the present invention.

The operation of a projection screen 10 having double curvature and utilizing the first embodiment of the present invention is illustrated by way of reference to FIG. 1. Screen 10 is curved in two orthogonal directions so that the image projected thereon by projector 12 is reflected and focused in an area designated by dashed lines 14. People 15 viewing the projected image should be seated in a generally triangular or trapezoidal configuration so that each person is within the area of brightest projection of the screen and sees the projected image clearly. A person outside of the area designated by lines 14 will see a dimmer image or none at all. Most light from sources other than the projector, such as overhead lights, will be reflected by doubly curved screen 10 so that the unwanted light is not projected within the designated area. As a result, persons within the designated area defined by lines 14 can easily see the projected image, even during the daytime.

The improvement in projection screens which is the subject of the first embodiment of the present invention is illustrated by way of reference to FIG. 2. Screen 10 includes a relatively thick structural backing 16 which maintains the shape of the screen which is curved in the embodiment of FIG. 2. Virtually any type of known backing material such as vinyl, fiberglass, etc., could be used for this purpose. The present invention provides a relatively thin transparent sheet material 18 which is located on the face of structural backing 16. This material is preferably Mylar, which is very stable and resiliant, but other suitable transparent material could be used as well. The face of transparent material 18 disposed toward structural backing 16 is metallized as indicated by layer 20, which can be bonded directly to the backing. The exposed surface 21 of the film comprises a matte (i.e., non-glossy) surface to diffuse incident light, which renders film somewhat translucent. Metallized layer 20 is the reflective surface upon which the image is projected so that it can be viewed by the audience. This metallized surface is preferably formed of aluminum which forms a uniform, highly reflective surface, but other reflective materials could be used. Reflective surface 20 is sandwiched between structural backing 16 and transparent material or film 18 so that it is protected from the environment and accidental damage when the screen is being moved or otherwise handled.

Use of the present invention with flat screens is illustrated in FIG. 2A, where 16', 18' and 20' designate the backing, transparent film and reflective surface respectively. Use of a flat screen is acceptable for long throw projection lenses, but hot spots will form if a short throw lens is used and the curved screen of FIG. 2 should be used.

Two alternate forms of the improved projector screen of the present invention are illustrated in FIGS. 3A and 3B. In FIG. 3A, a plurality of striations or lenticles 22 are formed on the exterior face of transparent film 18. Striations 22 can be shaped as desired and are usually vertically aligned to evenly spread the focused image laterally throughout the designated viewing area so that each person in the area sees a clear, bright sharp picture. Striations 22 provide the necessary matte surface, and can be brushed, etched or otherwise formed in the surface.

As an alternative, striations 24 can be provided on the interior surface of transparent film 18 as illustrated in FIG. 3B. In this instance, striations 24 can be formed by brushing the transparent material 18 in a generally vertical direction. The aluminum or other reflective material is deposited or plated directly over the striations. In this manner, the striations and reflective plating are protected from damage, and this configuration is preferred over that illustrated previously. The striations still serve to spread the focused image laterally throughout the designated viewing area. In this embodiment, the outer surface 26 of transparent film 18 should be provided with a random matte surface which diffuses light projected thereon so that its surface is not reflected into the viewing area.

The manner in which the second embodiment of the present invention is constructed as illustrated by way of reference to FIGS. 4A–D in combination. In FIGS. 4A–D, the visible characteristics of the invention are greatly magnified for clarity.

Figures 4A, 4B, 4C, 4D, 5, 6:
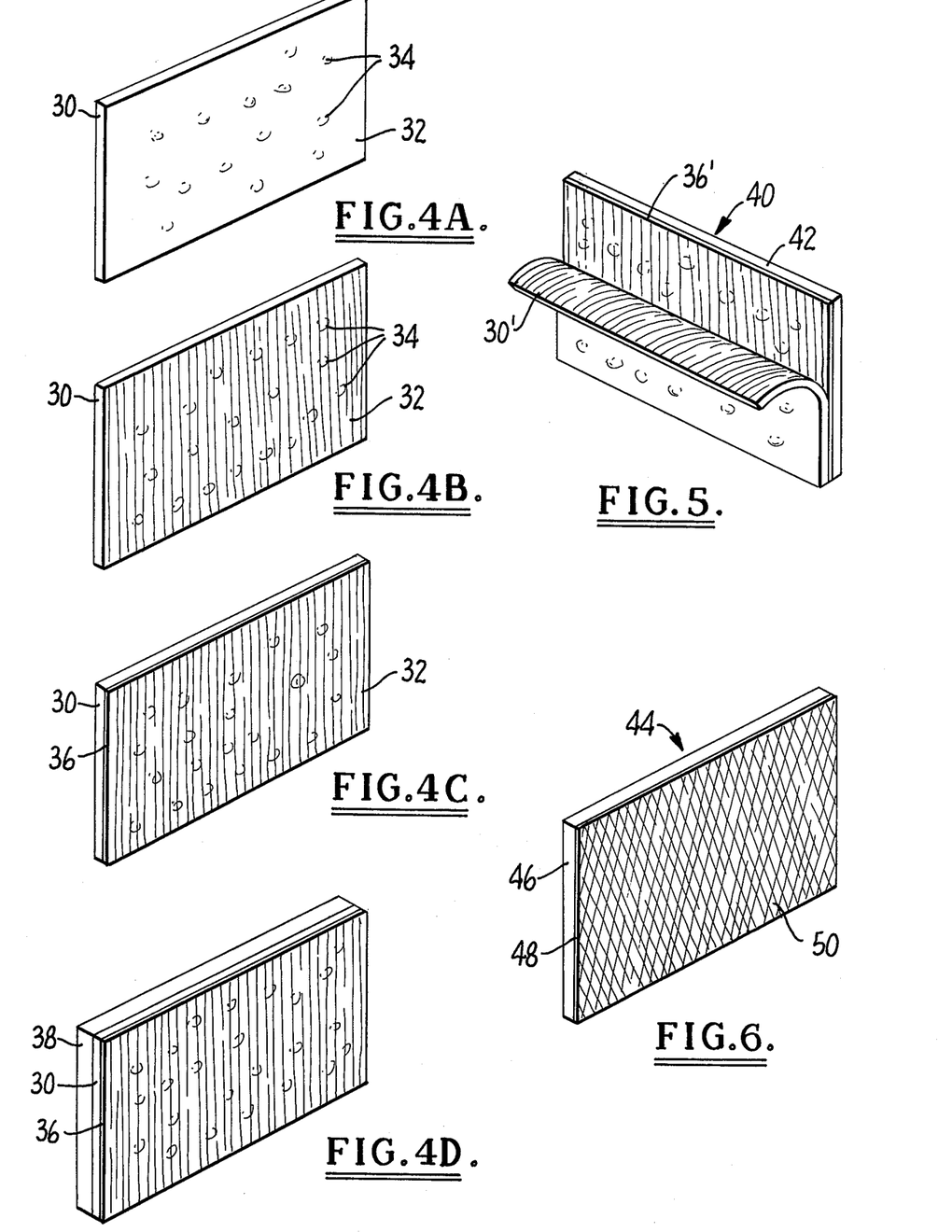

Initially, a resilient stable film 30 such as that known in the trade as Mylar with a random matte or textured surface 32 is selected (See FIG. 4A). Matte surface 32 is preferably developed by filling or adding a silica powder with average particle size of approximately 20 microns to the base material. (The size particles used are selected to provide the desired degree of matte dispersion discussed hereinafter.) Such material is provided by DuPont in their EB-11 92 gauge (0.001 inch) Mylar material. The resulting surface 32 provides for dispersion of incident light throughout a preselected conical region, the degree of matte (i.e., the amount of roughness) determining the size of the dispersion cone.

Surface 32 of film 30 is thereafter processed to achieve elongate striations in a common direction (usually vertical) as illustrated in FIG. 4B. The striations 34 are preferably formed by brushing surface 32, but can also be formed by printing or coating, etching, abrasion, stretching/shrinking, shock wave, erosion and other techniques. In any event, the resulting surface should be provided with approximately 1–4,000 or more striations per lineal inch. The striations 34 are formed directly over the matte surface 32 but the grainy texture of the matte surface is not wholly obliterated. Instead, surface 32 is provided with a combination of a random matte texture and linear striations 34.

After surface 32 of film 30 has been provided with a common combined matte and striated texture, a thin layer 36 of aluminum or other appropriate reflective material is deposited on surface 32, as illustrated in FIG. 4C. Layer 36 is sufficiently thin so that the exposed surface of the layer retains the texture of underlying surface 32. As a result, the exposed surface of deposited layer 36 has the combined matte texture and striated texture of underlying surface 32.

After layer 36 has been formed on film 30, the composite may be bonded to a structural backing 38. Backing 38 may be comprised of polyvinyl chloride or other appropriate material for the formation of a finished viewing screen. With a backing such as 38, film 30 can be formed into the desired shape such as the doubly curved screen illustrated in FIG. 1.

Figure 7A:
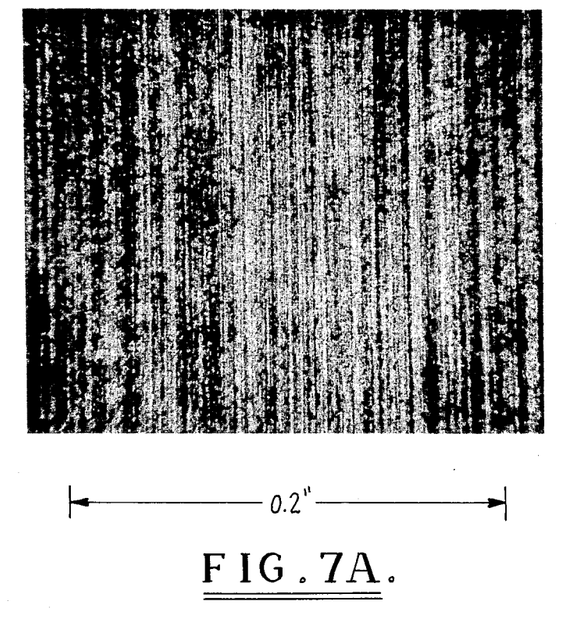
FIGS. 7A–D are photomicrographs of the reflective surface of the second embodiment of the present invention at magnifications of 20, 40, 400 and 800 respectively.
Figure 7B:
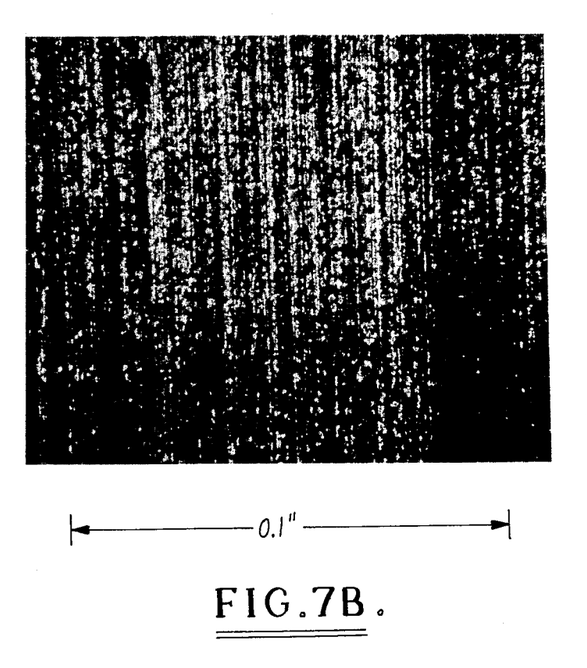
Figure 7C:
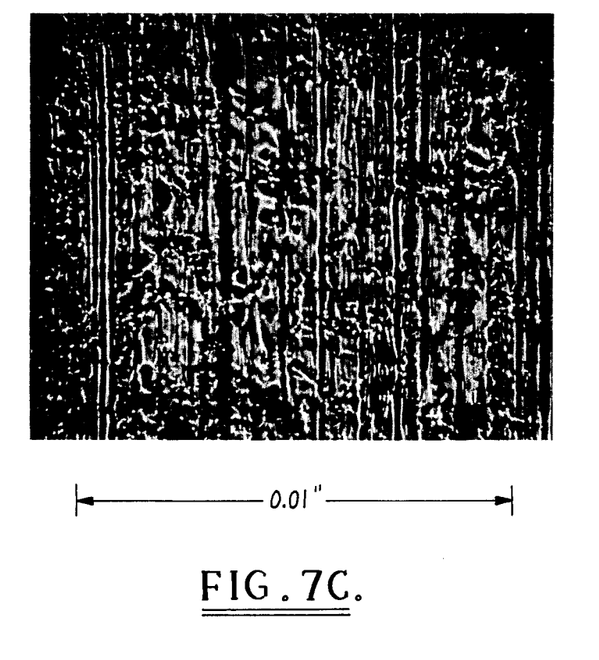
Figure 7D:
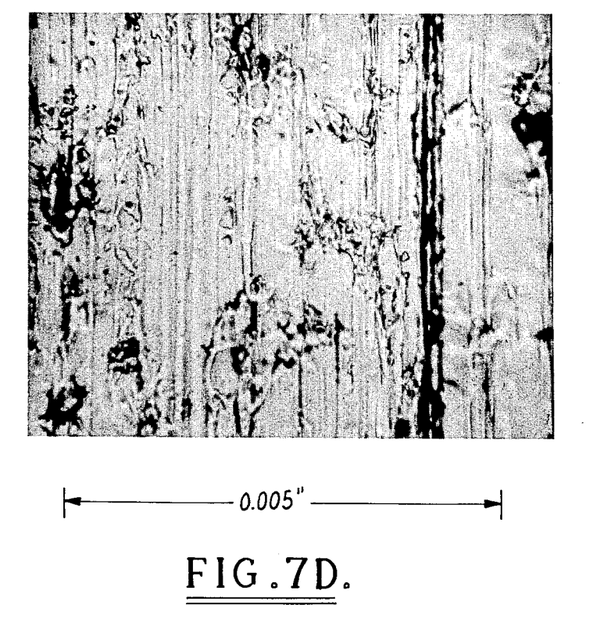

The configuration of the reflective layer 36 of the second embodiment of the present invention is illustrated by way of reference to FIGS. 7A–D, illustrating the layer in various stages of magnification. In FIG. 7A, illustrating layer 36 at a magnification of 20, the virtually continuous elongate striations are readily visible. In FIG. 7B, with a magnification of 40, the internal irregularities of the striations and the slightly mottled appearance of the matte texture become more apparent. In FIGS. 7C and D, having magnifications of 400 and 800 respectively, it is apparent that significant imperfections are present in the vertical striations due at least in part to the original matte texture.

The matte texture of layer 36 gives the reflective layer a limited conical dispersion of $+10°$ to $+12°$. The linear striations result in a greater dispersion of the projected light in a direction perpendicular to the striations themselves. Under normal lighting conditions, the useful dispersion is approximately $+20°$, where the greatest amount of reflected light is concentrated. In conditions of very low ambient light, useful dispersion may be sowewhat greater.

In situations where a number of people are arranged in a generally horizontal array, for example, persons watching a large screen projection television, or several persons as in FIG. 1 hereof, only a slight vertical dispersion is required to provide acceptable viewing for all viewers. A relatively larger horizontal dispersion is required to accommodate the same viewers. Accordingly, the screen material of the second embodiment of the present invention can be arranged so that the striations are vertical, and the screen material has limited vertical dispersion and somewhat greater horizontal dispersion to accommodate all viewers.

The screen material of the second embodiment of the present invention has relatively high gain, and it has been found that a significant curvature is required of the screen material to prevent hot spots from forming. Accordingly, except for situations which the focal length is extremely long relative to the dimensions of the screen, the screen material of the second embodiment is generally considered to be undesirable for use as a flat screen.

It is immediately apparent that in the second embodiment of the present invention, as in the compression roll screens discussed hereinabove, the reflective surface itself is exposed (note in the first embodiment it is not exposed and is protected). It is possible, of course, that the reflective surface could be provided with a protective coating or otherwise covered, such as with a lacquer. However, it has been found in the second embodiment of the present invention, the reflective layer itself is relatively impervious to damage even when exposed. The texture of the reflective layer is caused by the underlying film, which has the same texture as the reflective layer. When an object contacts the reflective layer, the layer together with the underlying film is deformed. Since the film is resilient, when the object is removed, the film together with the reflective layer returns to its original configuration and the screen is not permanently damaged. The reflective layer is extremely thin relative to the supporting layer of resilient material, and does not impede the resilient characteristics of the underlying film. In constrast, in the compression roll screens known in the art, the reflective layer itself gives the layer its texture, and the underlying support surface does not have an equivalent texture. The reflective layer in such screens is not resilient, and if an object contacts this type of reflective layer, it is usually permanently deformed and irretrievably damaged.

In FIG. 5, a first variation 40 in the construction of the second embodiment is illustrated. In this variation, the second embodiment is formed as illustrated in FIGS. 4A–C except that the exposed surface 32 of sheet 30 is coated with a non-adhesive substance or is otherwise non-adhesive. After the screen material is formed, the metal layer such as 36' is bonded to a supporting film 42. Original film 30' is then peeled off, leaving layer 36' adhering to film 42. The exposed surface of layer 36' retains the combined matte and striated texture of original film 30'.

A second variation 44 of the second embodiment of the present invention is illustrated by way of reference to FIG. 6. In this embodiment, an original sheet 46 is used which does not necessarily have a matte texture. The front surface 48 of sheet 46 is striated in two directions both of which are inclined slightly from vertical so as to be acutely inclined with respect to one another as illustrated so that the front surface has a lesser dispersion in one direction (usually vertical) as compared to its dispersion in a second orthogonal direction (usually horizontal) to accommodate an audience. Front surface 48 is then provided with a deposited layer 50 of aluminum or other reflective material to complete the reflective screen surface. Other techiques could also be used to disperse the light vertically and horizontally as desired. Also sheet 46 could itlself comprise a reflective material such as stainless steel and no layer such as 50 need be deposited, sheet 46 providing the reflective surface when prepared as described above to properly disperse the light.

While preferred embodiments of the present invention have been illustrated hereinabove, it is apparent that modifications and adaptations of those embodiments will occur to those skilled in the art. However, it is to be expressly understood that such modifications and adaptations are within the spirit and scope of the present invention, as set forth in the following claims.

What I claim as new is:

1. In a projection screen including a structural backing and a reflective element overlying said backing, an improved reflective element comprising a transparent film metallized on one surface and having a second, opposite matte surface, said film mounted to said structural backing so that the metallized surface is adjacent the structural backing and the matte surface of the transparent film is exposed in order that light from a projector or other source passes through the matte surface of the film to be reflected by the metallized surface and the metallized surface is protected from damage, one of said surfaces of the transparent film including elongate striations in a single direction to relatively evenly spread the reflected image over a predesignated area.

2. A projection screen as recited in claim 1 wherein the striations are formed in the metallized surface of the transparent film.

3. A projection screen as recited in claim 1 wherein the matte surface of the transparent film comprises said elongate striations.

4. A projection screen as recited in claim 1 wherein the metallized surface of the film comprises an aluminized surface.

5. A projection screen as recited in claim 1 wherein the structural backing is curved.

6. A projection screen as recited in claim 1 wherein the structural backing is flat.

7. A projection screen adapted to increase the visibility of an image projected thereon in a designated area to render the image visible in the presence of ambient light even during the daytime, said projection screen comprising:
a backing having two-dimensional concave curvature;
a transparent film aluminized on one surface and having generally vertical striations formed in said one surface thereof, the second opposite surface of the film comprising a matte surface, the aluminized surface of the film mounted to the backing so that light from a projector or other source passes through the matte surface of the film to be reflected by the aluminized surface of the film and the aluminized surface is protected from damage, the striations in said one surface of the film adapted to spread the reflected image relatively evenly over the designated area.

8. A projection screen comprising:
a film constructed of at least partially deformable, resilient material and including a forward surface having in combination a substantially random matte texture and a substantially unidirectional striated texture; and
a layer of reflective material deposited on said forward surface of the film to provide a highly reflective, damage resistant reflective surface on said forward surface of the film having limited dispersion of a reflected image in one direction and greater dispersion in a second orthogonal direction to accommodate an audience.

9. A projection screen as recited in claim 8 and additionally comprising a backing having concave curvature, and wherein said film is mounted to said backing.

10. A projection screen as recited in claim 8 wherein the film is constructed of Mylar.

11. A projection screen as recited in claim 8 wherein the layer of reflective material comprises deposited aluminum.

12. A projection screen as recited in claim 8 wherein the deposited aluminum has an oxide coating on the exposed surface thereof.

13. A projection screen comprising:
a support medium constructed of at least partially deformable, resilient material and having a forward surface, said forward surface including in combination a random matte texture and a substantially unidirectional striated texture;
means for mounting said support medium so that the forward surface thereof has compound concave curvature; and
a layer of reflective material deposited on the forward surface of the support medium to provide a high gain, damage resistant reflective surface on the forward surface of said medium.

14. A projection screen as recited in claim 13 wherein said support medium is constructed of Mylar.

15. A projection screen as recited in claim 13 wherein the support medium includes particulate matter so as to provide a random matte texture on the forward surface thereof.

16. A projection screen as recited in claim 15 wherein the particulate matter comprises silica particles having a diameter of approximately 20 microns.

17. A projection screen as recited in claim 13 wherein the forward surface of the support medium is brushed to provide a substantially unidirectional striated texture.

18. A projection screen as recited in claim 17 wherein the brushed forward surface of the support medium is polished to remove burrs on said brushed surface which may scatter incident light.

19. A projection screen as recited in claim 13 wherein the layer of reflective material comprises deposited aluminum.

20. A projection screen as recited in claim 19 wherein the deposited aluminum has a protective oxide coating on the exposed surface thereof.

21. A projection screen comprising:
a support medium constructed of at least partially deformable resilient material and having a forward surface, said support medium including filled particulate matter to provide said forward surface with a random matte texture, said forward surface further having a substantially unidirectional striated texture in combination with said matte texture; and a layer of reflective material deposited on the forward surface of the support medium to provide a high gain, damage resistant reflective surface on the forward surface of said medium having limited dispersion of a reflected image in one direction and greater dispersion in a second orthogonal direction to accommodate an audience.

22. A projection screen as recited in claim 21 and additionally comprising means for mounting said support medium so that the forward surface thereof has compound concave curvature.

23. A projection screen as recited in claim 21 wherein the particulate matter comprises silica particles having a diameter of approximately 20 microns.

24. A projection screen as recited in claim 21 wherein the forward surface of the support medium is brushed to provide a substantially unidirectional striated texture.

25. A method of forming a projection screen comprising the steps of:
providing a film of at least partially deformable, resilient material and having a forward surface including a random matte texture;
brushing the forward surface of the film to provide said film with a substantially unidirectional striated texture in combination with said matte texture; and
depositing a layer of reflective material on the forward surface of the film to provide a high gain, damage resistant reflective surface on the forward surface of said film.

26. A method as recited in claim 25 wherein said providing step includes the step of interposing particulate matter in said film to provide the forward surface of the film with said matte texture.

27. A method as recited in claim 25 and additionally comprising the step of mounting the surface of the film opposite from said forward surface to a structural backing.

28. A method as recited in claim 27 wherein the structural backing is provided with compound concave curvature.

29. A method of forming a projection screen comprising the steps of:
providing a first support medium having a surface including in combination a random matte texture and a unidirectional striated texture;
depositing a layer of reflective material on and surface of the first support medium to provide a high gain reflective surface on said surface;
bonding the layer of reflective material to the forward surface of a second support medium; and
removing the first support medium from said layer of reflective material so that said layer of reflective material provides a high gain reflective forward surface bonded to the surface of said second support medium.

30. A method as recited in claim 29 and additionally comprising the steps of coating said surface of the first support medium with a nonadhesive substance prior to depositing the layer of reflective material on said surface of the first support medium.

31. A projection screen comprising:
a support material having a forward surface including a texture comprising a first set of striations having a common direction and a second set of striations having a common direction acutely inclined with respect to the common direction of the first set; and
a layer of reflective material located at said forward surface of the support material to provide a high gain reflective surface having limited dispersion of a reflected image in one direction and greater dispersion of said image in a second orthogonal direction to accommodate an audience.

32. A projection screen as described in claim 31 wherein said reflective material is deposited on the forward surface of said support material.

33. A projection screen as recited in claim 31 wherein the layer of reflective material comprises the forward surface of said support material.

* * * * *

UNITED STATES PATENT AND TRADEMARK OFFICE
CERTIFICATE OF CORRECTION

PATENT NO. : 4,089,587
DATED : May 16, 1978
INVENTOR(S) : CONRAD R. SCHUDEL

It is certified that error appears in the above-identified patent and that said Letters Patent are hereby corrected as shown below:

Column 1, line 30, change "protect" to -- project --.

Column 1, line 36, change "ane" to -- and --.

Column 5, line 64, change "$+10°$" to -- $\pm 10°$ --; line 64, change "$+12°$" to -- $\pm 12°$ --; line 68, change "$+20°$" to -- $\pm 20°$ --.

Column 7, line 9, change "itlself" to -- itself --.

Column 10, line 9, change "and" to -- said --; line 16, delete "forward"; line 17, add -- forward -- before "surface".

Signed and Sealed this

Tenth Day of July 1979

[SEAL]

Attest:

LUTRELLE F. PARKER
Attesting Officer   Acting Commissioner of Patents and Trademarks